US012776890B2

(12) United States Patent
Papancea

(10) Patent No.: US 12,776,890 B2
(45) Date of Patent: Oct. 27, 2026

(54) APPARATUS AND METHOD FOR BI-DIRECTIONAL INTERACTION BETWEEN USER CHANNELS AND A DIGITAL ASSET

(71) Applicant: Amazon Technologies, Inc., Seattle, WA (US)

(72) Inventor: Andrei Papancea, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/358,979

(22) Filed: Oct. 15, 2025

(65) Prior Publication Data

US 2026/0312784 A1 Oct. 8, 2026

Related U.S. Application Data

(60) Provisional application No. 63/785,203, filed on Apr. 8, 2025.

(51) Int. Cl.
*G06F 16/954* (2019.01)
*H04L 7/00* (2006.01)

(52) U.S. Cl.
CPC .................................. *H04L 7/0008* (2013.01)

(58) Field of Classification Search
CPC ..................................................... H04L 7/0008
See application file for complete search history.

(56) References Cited

U.S. PATENT DOCUMENTS 5,168,519 A 12/1992 Scarinci et al.
5,892,813 A 4/1999 Morin et al.
7,123,709 B1 10/2006 Montgomery et al.
7,406,657 B1 7/2008 Callaghan et al.
(Continued)

FOREIGN PATENT DOCUMENTS

CN 117667054 A 3/2024
CN 117827184 A 4/2024
(Continued)

OTHER PUBLICATIONS

Cai et al., "Low-code LLM: Graphical user interface over large language models," arXiv:2304.08103v3 [cs.CL], Apr. 1, 2024, 14 pages.
(Continued)

*Primary Examiner* — Dai Phuong
(74) *Attorney, Agent, or Firm* — Knobbe, Martens, Olson & Bear, LLP

(57) ABSTRACT

In an embodiment, a request associated with a digital asset is received over a first channel. Connection information for a second channel is sent over the first channel. The first channel and the second channel are synchronized. End user input related to the digital asset and context information of the digital asset is received. The end user input is classified into at least one of a first class or a second class. An instruction that includes an indication of the first class and relevant metadata to cause a compute device to execute the instruction to be sent over the first channel and in response to the end user input being classified as the first class. A message to cause the compute device to output content of the message is sent over the second channel and in response to the end user input being classified as the second class.

20 Claims, 4 Drawing Sheets

(56) References Cited

U.S. PATENT DOCUMENTS

| | | | |
|---|---|---|---|
| 7,693,720 B2 | 4/2010 | Kennewick et al. | |
| 8,195,468 B2 | 6/2012 | Weider et al. | |
| 8,443,041 B1 * | 5/2013 | Krantz | H04L 51/04 709/224 |
| 8,761,379 B2 | 6/2014 | Davis et al. | |
| 8,983,383 B1 | 3/2015 | Haskin | |
| 9,207,906 B2 | 12/2015 | Kim et al. | |
| 9,325,845 B2 | 4/2016 | Nguyen et al. | |
| 9,521,259 B2 | 12/2016 | Davis et al. | |
| 9,955,205 B2 | 4/2018 | Covell et al. | |
| 9,961,120 B2 | 5/2018 | Krishnan et al. | |
| 10,051,131 B2 | 8/2018 | Saylor et al. | |
| 10,469,664 B2 | 11/2019 | Pirat et al. | |
| 10,484,539 B2 | 11/2019 | Kumar et al. | |
| 10,523,816 B1 | 12/2019 | Neuer, III et al. | |
| 10,637,989 B1 | 4/2020 | Josh et al. | |
| 11,276,407 B2 | 3/2022 | Reshef et al. | |
| 11,461,562 B2 | 10/2022 | Papancea | |
| 11,514,082 B1 * | 11/2022 | Ozorhan | G06F 16/583 |
| 11,687,737 B2 | 6/2023 | Papancea | |
| 12,190,416 B1 | 1/2025 | Papancea et al. | |
| 12,469,483 B1 * | 11/2025 | Tran | G06F 40/56 |
| 2002/0090062 A1 | 7/2002 | Mohamed Alhadad et al. | |
| 2003/0162561 A1 | 8/2003 | Johnson et al. | |
| 2003/0234763 A1 | 12/2003 | Hejza Litwiller | |
| 2005/0010418 A1 | 1/2005 | McNAIR et al. | |
| 2005/0101300 A1 * | 5/2005 | Hon | H04M 3/4938 707/E17.119 |
| 2005/0131911 A1 * | 6/2005 | Chi | G06F 16/9577 |
| 2009/0149158 A1 | 6/2009 | Goldfarb et al. | |
| 2009/0247136 A1 | 10/2009 | Srinivasan et al. | |
| 2012/0069975 A1 | 3/2012 | Odinak et al. | |
| 2013/0007147 A1 | 1/2013 | Toga et al. | |
| 2013/0108994 A1 | 5/2013 | Srinivasa et al. | |
| 2013/0294595 A1 | 11/2013 | Michaud et al. | |
| 2015/0348544 A1 | 12/2015 | Baldwin et al. | |
| 2016/0171772 A1 | 6/2016 | Ryznar et al. | |
| 2016/0219147 A1 | 7/2016 | Maxwell et al. | |
| 2016/0301810 A1 | 10/2016 | Dimitroff et al. | |
| 2017/0285848 A1 | 10/2017 | Rosenberg et al. | |
| 2017/0324868 A1 | 11/2017 | Tamblyn et al. | |
| 2017/0359463 A1 | 12/2017 | Segalis et al. | |
| 2018/0052884 A1 | 2/2018 | Kale et al. | |
| 2019/0037077 A1 | 1/2019 | Konig et al. | |
| 2019/0139432 A1 | 5/2019 | Jain et al. | |
| 2019/0377544 A1 | 12/2019 | Darachi, Jr. et al. | |
| 2020/0177730 A1 | 6/2020 | Dutta et al. | |
| 2021/0084150 A1 | 3/2021 | Nagy | |
| 2021/0124782 A1 | 4/2021 | Karaca et al. | |
| 2022/0164550 A1 | 5/2022 | Papancea et al. | |
| 2023/0004731 A1 | 1/2023 | Papancea et al. | |
| 2023/0065468 A1 | 3/2023 | Lu et al. | |
| 2023/0103076 A1 * | 3/2023 | Zhou | G06F 21/6218 726/1 |
| 2023/0274103 A1 | 8/2023 | Papancea et al. | |
| 2023/0393832 A1 | 12/2023 | Touati et al. | |
| 2024/0111498 A1 | 4/2024 | Vaughn | |
| 2024/0311348 A1 | 9/2024 | Lutz | |
| 2024/0346256 A1 | 10/2024 | Qin | |
| 2024/0347058 A1 | 10/2024 | Rossi et al. | |
| 2025/0037711 A1 | 1/2025 | Baeuml et al. | |
| 2025/0095244 A1 | 3/2025 | Papancea et al. | |
| 2025/0104017 A1 | 3/2025 | Peter et al. | |
| 2025/0356187 A1 | 11/2025 | Papancea et al. | |

FOREIGN PATENT DOCUMENTS

| | | |
|---|---|---|
| WO | WO-2019236120 A1 | 12/2019 |
| WO | WO-2022109149 A1 | 5/2022 |
| WO | WO-2025034997 A1 | 2/2025 |

OTHER PUBLICATIONS

CallVU, CallVU Visual IVR—Banking, [Online], Screenshots, Retrieved from the Internet: https://www.youtube.com/watch?v=94IlhLCNbZ0, Sep. 2020, 2 pages.

ChoiceView, ChoiceView Visual IVR Insurance Claim [Online], Screenshots, Retrieved from the Internet: https://www.youtube.com/watch?v=FCFGZLp7qOE, Sep. 2020, 2 pages.

European Application No. 21835458.7, Office Action mailed Mar. 27, 2025; Applicant: NLX, Inc.; 9 pages.

European Application No. 21835458.7, Office Action mailed Oct. 1, 2025; Applicant: NLX, Inc.; 12 pages.

European Application No. 21835458.7, Office Action mailed Oct. 28, 2024; Applicant: NLX, Inc.; 10 pages.

Hu, Y. et al., "Code prompting: a neural symbolic method for complex reasoning in large language models," arXiv:2305.18507v1 [cs.CL], submitted May 29, 2023, 31 pages.

Hu, Y. et al., "Code prompting: a neural symbolic method for complex reasoning in large language models," arXiv:2305.18507v2 [cs.CL], submitted May 29, 2023, revised Oct. 7, 2023, 33 pages.

Huang, Q. et al., "PRODIGY: Enabling In-context Learning Over Graphs," arXiv:2305.12600v1 [cs.LG], May 2023, 15 pages.

International Application No. PCT/US2021/059911, International Search Report and Written Opinion mailed Mar. 1, 2022; Applicant: NLX, Inc; 15 pages.

International Application No. PCT/US2024/041520, International Preliminary Report on Patentability mailed Feb. 19, 2026; Applicant: NLX, Inc.; 9 pages.

International Application No. PCT/US2024/041520, International Search Report and Written Opinion mailed Oct. 30, 2024; Applicant: NLX, Inc; 15 pages.

International Application No. PCT/US2025/030060, International Search Report and Written Opinion mailed Sep. 29, 2025; Applicant: NLX, Inc.; 14 pages.

John, R. J. L. et al., "A natural language interface for dissemination of reproducible biomedical data science," Med Image Comput Comput Assist Interv., Sep. 2018, vol. 11073, pp. 197-205. doi: 10.1007/978-3-030-00937-3_23. Epub Sep. 13, 2018.

Plum IVR Support, "How to Extend the Time the Caller Has to Enter Numbers," [Online], Feb. 2010, Retrieved from the Internet: https://support.plumvoice.com/viewtopic.php?f=2&t=591, 4 pages.

Tech with Sach, "Build a Chatbot, Call Agent and Actions for Google Assistant using Dialogflow Knowledge Base," [Online], May 4, 2020, time stamps 6:05, 6:07, 6:15, 6:22, 6:28, 6:29, 6:33, 6:36, 6:39, 6:40, 6:48, 6:50, 6:54, 7:00, 7:12, 7:13, 7:17, 7:45, 8:45, 8:47, 8:54, 8:57, 9:03, 9:05, 9:18, 9:30, 9:31, 9:33, 9:38, 9:40, 9:47, 9:53, Retrieved from the Internet: https://www.youtube.com/watch?v=aahtxFGiSko, 33 pages.

Uniphore, "Multimodal User Experience Design Best Practices," [Online], Aug. 2021, Retrieved from the Internet: https://www.uniphore.com/blog/multimodal-user-experience-design-best-practices/, 8 pages.

Uniphore, "What's a Multimodal Customer Experience?" [Online], Oct. 2019, Retrieved from the Internet: https://www.uniphore.com/blog/what-s-a-multimodal-customer-experience/, 1 page.

U.S. Appl. No. 17/532,662, Office Action mailed Apr. 4, 2022; Inventor: Papancea, Andrei; 16 pages.

U.S. Appl. No. 17/932,162, Office Action mailed Nov. 15, 2022; Inventor: Papancea, Andrei; 9 pages.

U.S. Appl. No. 18/315,027, Office Action mailed Aug. 13, 2024; Inventor: Papancea, Andrei; 28 pages.

U.S. Appl. No. 18/315,027, Office Action mailed Jun. 18, 2025; Inventor: Papancea, Andrei; 26 pages.

U.S. Appl. No. 18/315,027, Office Action mailed Mar. 17, 2025; Inventor: Papancea, Andrei; 25 pages.

U.S. Appl. No. 18/315,027, Office Action mailed Mar. 2, 2026; Inventor: Papancea, Andrei; 19 pages.

U.S. Appl. No. 18/315,027, Office Action mailed Nov. 12, 2024; Inventor: Papancea, Andrei; 25 pages.

U.S. Appl. No. 18/315,027, Office Action mailed Oct. 8, 2025; Inventor: Papancea, Andrew; 25 pages.

(56) References Cited

OTHER PUBLICATIONS

U.S. Appl. No. 18/985,972, Office Action mailed Apr. 29, 2025; Inventor: Papancea, Andrei; 63 pages.
U.S. Appl. No. 18/985,972, Office Action mailed Nov. 26, 2025; Inventor: Papancea, Andrei; 66 pages.
Young, T. et al., "Fusing Task-Oriented and Open-Domain Dialogues in Conversational Agents," Proceedings of the AAAI Conference on Artificial Intelligence (AAAI-22), vol. 36, No. 10, (Jun. 2022), pp. 11622-11629.

* cited by examiner

400

APPARATUS AND METHOD FOR BI-DIRECTIONAL INTERACTION BETWEEN USER CHANNELS AND A DIGITAL ASSET

CROSS REFERENCE TO RELATED APPLICATION

This application claims priority to U.S. Provisional Patent Application No. 63/785,203, filed Apr. 8, 2025, and titled "APPARATUS AND METHOD FOR BI-DIRECTIONAL INTERACTION BETWEEN A USER CHANNEL AND A DIGITAL ASSET," the contents of which are incorporated by reference herein in its entirety.

FIELD

In one or more embodiments, user channels (e.g., a conversational channel and/or a non-conversational channel) can be synchronized and interact with a digital asset (e.g., a website).

BACKGROUND

Accessing information and navigating graphical user interfaces (GUIs) can be challenging at times (e.g., due to a disability of the user, poor user experience (UX), etc.). For example, clicking through an application to get access to the right information or navigate a complex process can be time consuming. Known interfaces often lack natural language interaction, making it difficult for users to express their needs directly. Users may also struggle to find specific functions or information within complex applications without clear verbal guidance. Inputting data or navigating forms can be cumbersome, especially on mobile devices or for users with limited dexterity.

Many tasks across various industries and applications can be streamlined and made more accessible using existing digital assets. Examples of such applications include applications for navigating educational platforms, managing personal finances, completing online forms, or interacting with smart home devices.

Known solutions often rely on interactive voice response (IVR) systems for audio interactions, which typically require users to navigate menus by pressing numbers or speaking specific commands. These IVR systems are often impractical for complex tasks involving detailed input or nuanced understanding. These IVR systems can lead to user frustration due to language misunderstandings or system timeouts. For more complex scenarios, users are often directed to websites or mobile apps without further guidance, resulting in a fragmented and less than ideal experience.

Known automated solutions often fail to provide a seamless and guided experience throughout the entire task. Also, known solutions often rely on the existence of and access to application programming interface (API) systems to perform such tasks. Such API systems sometimes do not exist and sometimes are not optimized or accessible by known conversational systems. Furthermore, end users may be left to navigate complex interfaces on their own or face abrupt disconnections. Many users may lack the necessary technical knowledge to self-serve effectively. Furthermore, known solutions often lack the flexibility and sophistication of natural language interaction, leading to rigid and frustrating user experiences.

Thus, a need exists to automate and simplify such tasks, providing a more efficient and naturally intuitive user experience.

SUMMARY

In an embodiment, a request associated with a digital asset is received from a compute device and over a first channel. Connection information for a second channel is sent to the compute device, over the first channel, and in response to the request. The first channel and the second channel are synchronized. End user input related to the digital asset and context information of the digital asset is received from the compute device. The end user input is classified into at least one of a first class or a second class. An instruction that includes an indication of the first class and relevant metadata to cause the compute device to execute the instruction to be sent to the compute device, over the first channel, and in response to the end user input being classified as the first class. A message to cause the compute device to output content of the message is sent to the compute device, over the second channel, and in response to the end user input being classified as the second class.

DETAILED DESCRIPTION

In one or more embodiments, any combination of two or more channels of human computer interaction (e.g., a graphical user interface (GUI), a chat user interface, or a voice user interface) can be synchronized so that action taken on one of the channels influences the other channel(s). For example, an end user can converse through a conversational channel such as a chat or voice interface/channel and can cause contextually relevant actions to be sent to another channel(s) such as a non-conversational channel for interfacing with a website, a mobile app, or an internet-of-things (IoT) device (e.g., car, airport kiosk, etc.). Actions can include, but are not limited to, actions associated with a digital asset (e.g., a website) such as navigation (e.g., switching between application screens, scrolling on a page, etc.), input (e.g., filling in input/form fields), or custom actions (also referred to herein as "user-defined actions") for a given implementation (e.g., triggering a unique function of a mobile app or website that do not relate to navigation or input, such as turning on the Global Positioning System (GPS) function on a mobile app). In addition, based on the conversation through a conversational channel (e.g., a chat channel or a voice channel), questions contextually relevant to the other channel can be answered (e.g., asking an open-ended question such as "how much for 20 users?"

while on a complex pricing page, could yield a contextual answer based on the page the end user compute device is viewing).

The term "channel" (also referred to as a "user channel") is used herein to describe, for example, a medium, method, link or pathway for communicating or passing information. As touched upon above, such a channel can include for example a conversational channel and a non-conversational channel. A conversational channel is used herein to describe, for example, a channel by which information in a human-understandable conversational form can be sent to and/or received from an end user at an end user compute device, such as a chat channel or a voice channel (e.g., a telephone call). The non-conversational channel is used herein to describe, for example, a channel by which information not intended for a human-understandable conversation can be sent to and/or received from a digital asset at (or accessible from) an end user compute device.

Figure 1:
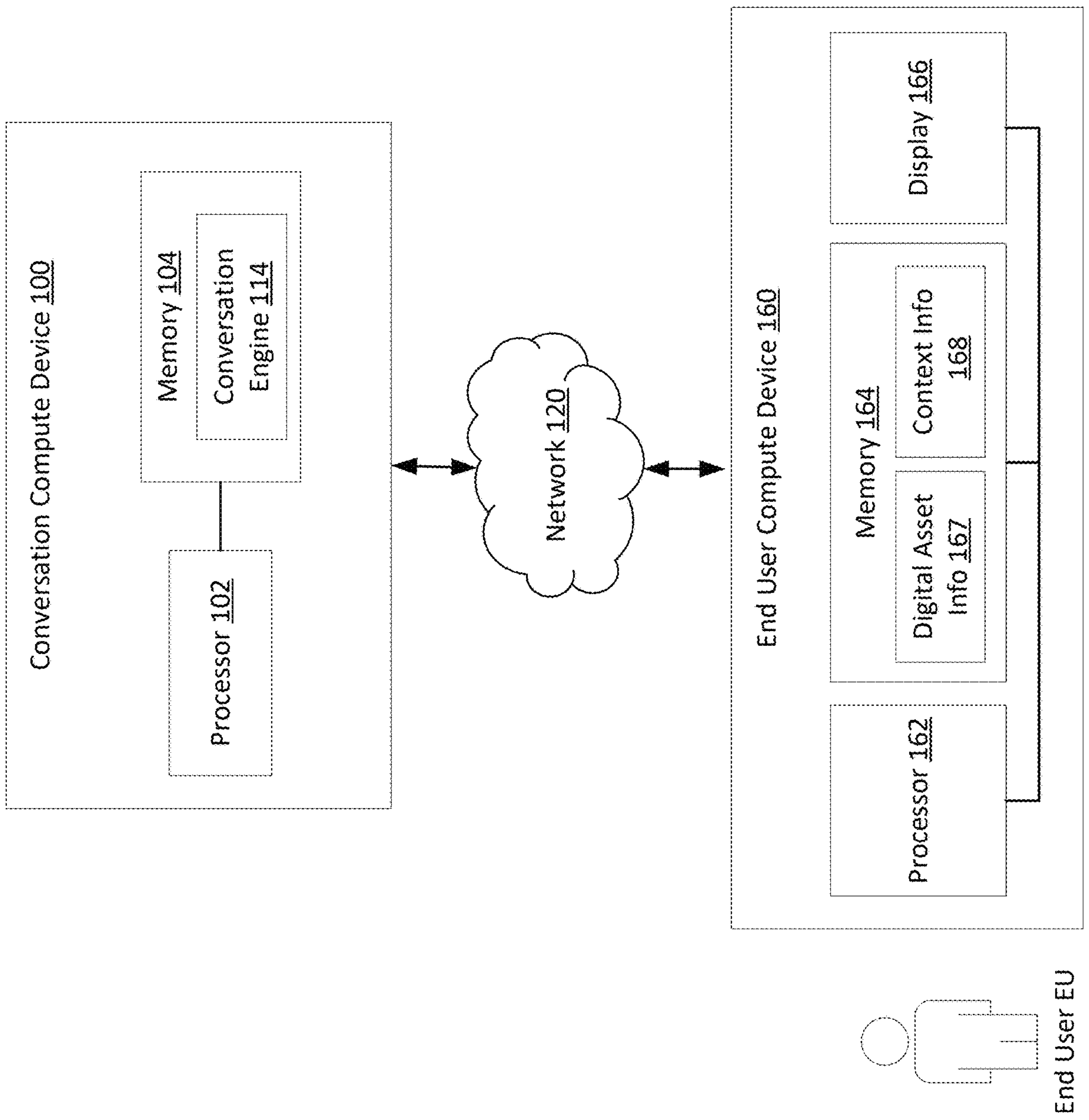
FIG. 1 shows a block diagram for a system to perform bi-directional interaction between a user channel(s) and a digital asset, according to an embodiment.

FIG. 1 shows a block diagram of a system to perform bi-directional interaction between a user channel(s) and a digital asset, according to an embodiment. As shown in FIG. 1, conversation compute device 100, and end user compute device 160 are interconnected by network 120.

The conversation compute device 100 can include, for example, a processor 102, a memory 104, and a communications interface (not shown). Processor 102 can be coupled to memory 104, and the communications interface. The processor 102 (e.g., a central processing unit (CPU), a graphics processing unit (GPU), and/or the like) can be, for example, a hardware-based integrated circuit (IC) or any other suitable processing device configured to run or execute a set of instructions or codes. The memory 104 (e.g., a random-access memory (RAM), a hard drive, a flash drive, and/or the like) of conversation compute device 100 can store data, and/or code that includes instructions to cause the processor 102 to perform one or more processes or functions. For example, memory 104 includes conversation engine 114 (also referred to as a natural language understanding (NLU engine), which can be executed by the processor 102 to perform the one or more processes or functions of the conversation engine 114.

More specifically, the conversation engine 114 can be software/module that is executable by processor 102 and that can receive end user input from end user compute device 160 and classify the end user input into categories or classes for example the following three categories/classes: a first class such as "navigation", a second class such as "input", a third class such as "user-defined action" and a fourth class such as "prompt". The end user input classified as "navigation" can be, for example, related to navigating the digital asset (such as digital asset 167), e.g., moving from one portion of the digital asset to another portion of the digital asset via vocal information, such as "go back", "show me pricing", etc. The end user input classified as "input" can be, for example, related to information provided by the user for input into or to be used by the digital asset such as "my address is 31 Hudson Yards, New York, NY 10001" in response to a form on a website that requests (or requires) an address. The end user input classified as "user-defined action" can be, for example, related to an action involving the digital asset (e.g., digital asset 167) that is defined by the user for example by the conversational channel such as "filter displayed search results to include just those matching my criteria". The end user input classified as "prompt" can be, for example, an open-end question such as "what times are the direct flights from New York City to Washington DC?" by which an end user can start the process for booking a trip; the "prompt" can also be in the form of a request such as "please let me know the times of direct flights from New York City to Washington DC." If the end user input is not classified as "navigation", "input" nor "prompt", then the end user input is deemed as unknown and no further action is taken; the end user input could be deemed as unknown, for example, when the end user input is actually background noise, questions unrelated to the conversation and/or context, etc. Such end user input can be ignored, i.e., not processed further.

Note that instances where the end user input is a compound statement and/or question involving multiple smaller end user inputs, the compound statement/question can be broken up into smaller portions and each smaller portion classified. For example, if the end user input is a complex statement/question such as: "my name is Sam and my email is sam@nlx.ai. also go back pls. what's your pricing? also, is your platform nice?", the question can be broken down into smaller portions such as two inputs "my name is Sam" "my email is sam@nlx.ai", a navigation "go back", and two questions "what's your pricing?" and "is your platform nice?".

The conversation engine 114 can further generate and send instructions and/or messages to the end user compute device 160 in response to the classification of the end user inputs. For example, when an end user input has been classified as "navigation", "input" or "user-defined action", the conversation engine 114 can determine the instruction format and information that when executed by the end user compute device 160, causing the digital asset to be updated by the instruction. For example, when the end user input has been classified as "navigation", then the conversation engine 114 can generate an instruction and related metadata to cause the digital asset to be updated in accordance with the navigation information of the end user input (e.g., navigate to the previously-viewed webpage from the website). Instructions and metadata generated (or determined or identified) by conversation engine 114 can be sent to the end user compute device over the non-conversational channel.

The conversation engine 114 can also generate and send messages to the end user compute device 160 in response to the classification of the end user input. For example, when an end user input has been classified as "question", the conversation engine 114 can determine the answer to the question. The message with the answer to the question can be sent over the conversational channel. This answer can be determined, for example, by a set of predefined answers to frequent questions. For a question that is an open-end question, the conversation engine 114 can generate a prompt related to the open-ended question for input to a large language model (LLM), which can be for example hosted and maintained at a separate compute device (not shown). In such an instance, the LLM can provide a response to the prompt, which the conversation engine 114 can forward as a message to end user compute device 160 or which the conversation engine 114 can use to generate a different message to send to end user compute device 160.

The end user compute device 160 can include, for example, a processor 162, a memory 164, display 166, and a communications interface (not shown). Processor 162 can be coupled to memory 164, display 166, and the communications interface. Processor 162, memory 164, and the communications interface of user compute device 160 can be similar to the processor 102, memory 104 and the communications interface of conversation compute device 100. The memory 164 can include information such as digital asset information 167 (e.g., a local copy of a webpage(s) from a website hosted at a different compute device (not shown) and context information 168 (e.g., time-sensitive information about the webpage(s) of the website such as an identification of the webpage, the link(s) displayed on the webpage, the information fields on the webpage, and/or etc.). The end user compute device 160 can be used, for example, by an end user to access the processes and services provided at conversation compute device 100 by engaging in an unscripted conversation including engaging with the conversation engine 114. Note that although FIG. 1 shows one end user compute device 160, it should be understood that any number of end user compute devices (for a given individual user and/or for multiple users) is possible. For example, a user can have one end user compute device that is a smart phone that is used for the conversational channel and a different end user compute device that is a desktop computer that is used for the non-conversational channel (for example a digital asset such as a webpage). For another example, a user can have multiple end user compute devices that are used for conversational channels (e.g., a smart phone, a table, a wireless smart speaker, etc.). In the case of multiple end users, a number of end users each can have a single end user compute device and a number of end users each can have multiple end user compute devices.

The communications network 120 can be any suitable communications network for transferring data, operating over public and/or private communications networks. For example, the communications network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communications network 120 can be a wireless network such as, for example, a Wi-Fi or wireless local area network ("WLAN"), a wireless wide area network ("WWAN"), and/or a cellular network. In other instances, the communications network 120 can be a wired network such as, for example, an Ethernet network, a digital subscription line ("DSL") network, a broadband network, and/or a fiber-optic network. The communications sent via the communications network 120 can be encrypted or unencrypted. In some instances, the communications network 120 can include multiple networks or subnetworks operatively coupled to one another by, for example, network bridges, routers, switches, gateways and/or the like.

Figure 2:
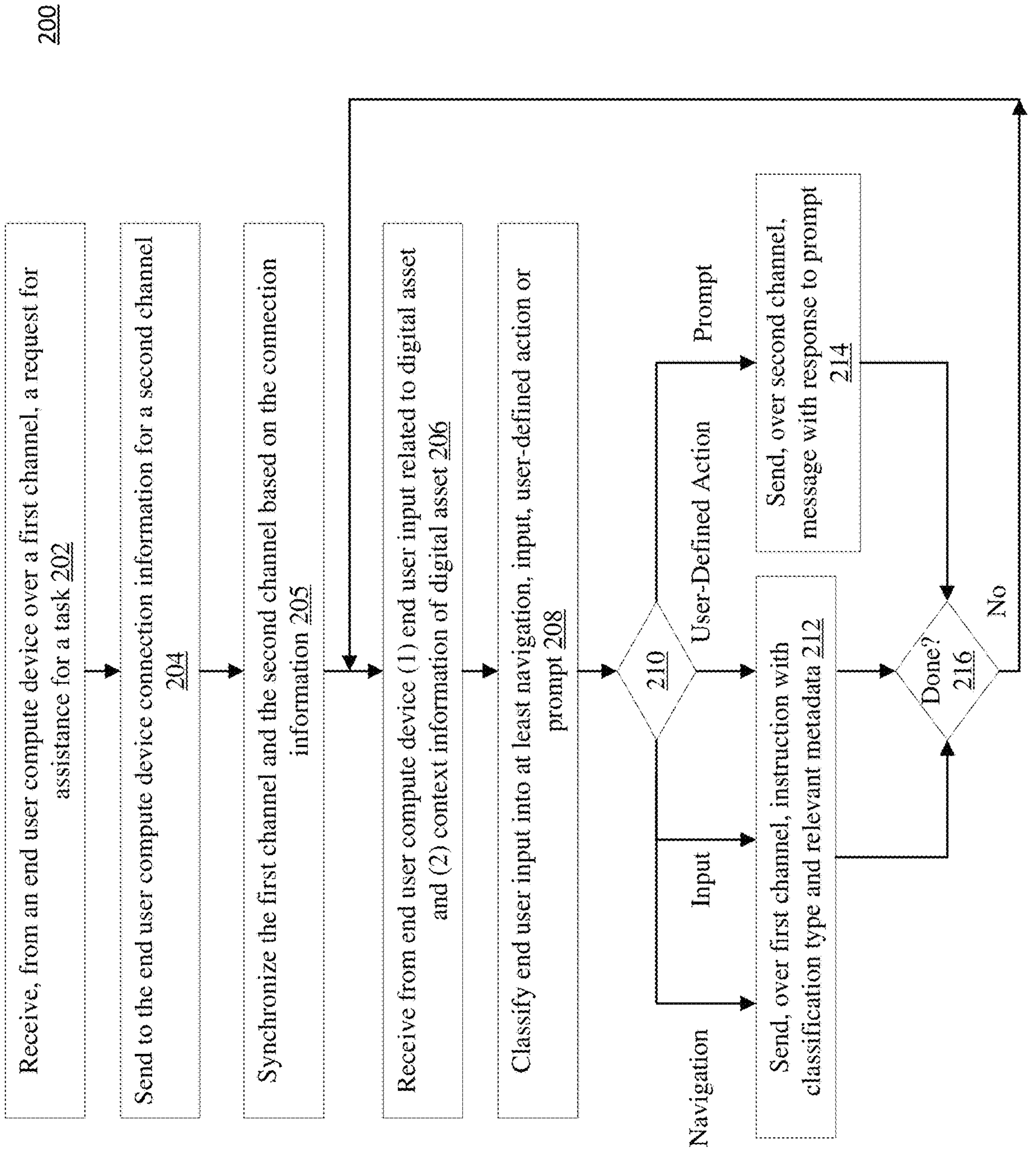
FIG. 2 shows a flowchart for performing a bi-directional interaction between a user channel(s) and a digital asset, according to an embodiment.

FIG. 2 shows a flowchart for performing a bi-directional interaction between a user channel(s) and a digital asset, according to an embodiment. As shown FIG. 2, at 202, a request for assistance for a task is received from an end user device (e.g., end user device 160 shown in FIG. 1) over a first channel (e.g., a conversational channel such as a chat or a voice channel). The request can be received at a conversation compute device (e.g., conversation compute device 100 of FIG. 1) different from the end user device. For example, the request for assistance can be in the form of a phone call over a voice channel from the end user compute device (e.g., a smartphone) such that the end user can engage with a smart interactive voice response (IVR) system that identifies the task to be resolved. Similarly, the end user compute device can be a voice-powered automated assistant implemented, for example, at a digital asset such as a website or mobile app, or at a physical asset such as a smart speaker; the voice-powered automated assistance can identify the task to be resolved. Alternatively, the request for assistance can be received over a chat channel (e.g., within a chat within a chat session) implemented, for example, through an interface of a digital asset such as a website or mobile app, or an interface of a physical asset such as a kiosk.

At 204, connection information for at least one additional channel (e.g., a second channel such as a conversation channel) is sent to the end user compute device. For example, the end user can be presented with a method to engage in a second channel. The conversation compute device can send to the end user compute device, for example, a short message service (SMS) text message based on the phone number used by the end user compute device to initiate the phone call on the voice channel; the SMS text message can include unique hyperlink that leads to a digital asset (e.g., a website) upon selection of the hyperlink. A code is sent with the message (e.g., SMS message, message via a mobile app, audio message via a smart speaker, etc.); the code can be entered by the end user into a digital asset of choice (e.g., website, mobile app, television (TV) app, etc.). A code, however, need not be sent if the end user started on the engagement on a channel that has support for multiple channels (e.g., a website or mobile app that has support for multiple channels such as a website or mobile app with a user-selectable button to start speaking over voice or start engaging over chat).

At 205, the first channel and the second channel are synchronized based on the connection information. For example, after an end user has provided the code in the digital asset (e.g., entering the code on field of a page of a website), the first channel and the second channel can be synchronized so that the rest of the process described in connection with FIG. 2 can be used on information sent and/or received on the first channel and/or the second channel.

At 206, end user input related to the digital asset and context information of the digital asset is received from the end user compute device. The end user input can be, for example, a request by the end user entered vocally or by typing (e.g., via keyboard). End user input that is provided by the end user vocally can be sent to a conversation engine (e.g., a conversation engine 114 of FIG. 1, which can be a natural language understanding (NLU) engine) that can interpret human speech or text. The context information of the digital asset can be, for example, information about the context of the state of the digital asset such as information about a website having a form, a website being a "contact us" page, a website having five other links on the page, etc. The context information can in addition or alternatively include information provided by the user and captured on the website such as the user's name, email address, mailing address, and/or etc.

The context information can include and/or can be identified, for example, based on the elements associated with a digital asset such as webpage elements (e.g., the fields) and any values contained within those webpage elements. Such context information can be, for example, provided from the digital asset by an application programming interface (API) call from a conversational compute device (such as conversational compute device 100 of FIG. 1), resulting in the context information being sent from the end user compute device (such as end user compute device 160 of FIG. 1) and received at the conversational compute device (such as conversational compute device 100 of FIG. 1). Alternatively, the context information can be predefined (preselected, predesignated, etc.) for each webpage of a website and pushed to a conversational compute device (such as conversational compute device 100 of FIG. 1). In other words, for a website that has been programmed to coordinate with a conversational compute device (such as conversational compute device 100 of FIG. 1) for example by a browser extension installed at the end user compute device (such as end user compute device 160 of FIG. 1), the webpage of that website with which the user is interacting can automatically (and repeatedly) push context information from the end user compute device to the conversational compute device (such as conversational compute device 100 of FIG. 1).

At 208, the end user input is classified into categories or classes, for example the following three categories/classes: a first class such as "navigation", a second class such as "input", a third class such as "user-defined action" and a fourth class such as "prompt". This classification can be performed by a conversation engine (e.g., conversation engine 114 of FIG. 1). The end user input classified as "navigation" can be, for example, related to navigating the digital asset, e.g., moving from one portion of the digital asset to another portion of the digital asset via vocal information, such as "go back", "show me pricing", etc. The end user input classified as "input" can be, for example, related to information provided by the user for input into or to be used by the digital asset such as "my address is 31 Hudson Yards, New York, NY 10001" in response to a form on a website that requests (or requires) an address. The end user input classified as "user-defined action" can be, for example, related to an action involving the digital asset (e.g., digital asset 167) that is defined by the user for example by the conversational channel such as "filter displayed search results to include just those matching my criteria". The end user input classified as "prompt" can be, for example, an open-end question such as "what times are the direct flights from New York City to Washington DC?" by which an end user can start the process for booking a trip; the "prompt" can also be in the form of a request such as "please let me know the times of direct flights from New York City to Washington DC." If the end user input is not classified as "navigation", "input", "user-defined action" nor "prompt", then the end user input is classified is deemed as unknown and no further action is taken; the end user input could be deemed as unknown, for example, when the end user input is actually background noise, questions unrelated to the conversation and/or context, etc.

Note that instances where the end user input is a compound statement and/or question involving multiple smaller end user inputs, the compound statement/question can be broken up into smaller portions and each smaller portion classified. For example, if the end user input is a complex statement/question such as: "my name is Sam and my email is sam@nlx.ai. also go back pls. what's your pricing? also, is your platform nice?", the question can be broken down into smaller portions such as two inputs "my name is Sam" "my email is sam@nlx.ai", a navigation "go back", and two questions "what's your pricing?" and "is your platform nice?".

At 210, if the end user input is classified as either a first class (e.g., "navigation"), a second class (e.g., "input") or a third class (e.g., a user-defined action), then the process proceeds to 212. At 210, if the end user input is classified as a fourth class (e.g., "prompt"), then the process proceeds to 214.

At 212, an instruction is generated and sent to the end user via the first channel (e.g., the non-conversational channel) with the classification type and any relevant metadata. For example, for end user input that is classified as "navigation", the instruction can identify classification as "navigation" and the related website page information such as {"classification": "navigation", "uri": "/pricing.html"}. The generation of the instruction can be based on, for example, the context information. At 214, a message is sent to the end user via the second channel (e.g., the conversational channel) with the relevant response to the prompt (e.g., the relevant answer when the prompt is a question). The message can be based on, for example, the context information.

Following the earlier example of the compound statement/question, an instruction can be generated and sent, for each of the inputs "my name is Sam" "my email is sam@nlx.ai", to the non-conversational channel with the classification type ("input") and any relevant metadata (e.g., the website location requesting the end user name and email address). An instruction can also be generated and sent, for the navigation "go back", to the non-conversational channel with the classification type ("navigation") and any relevant metadata (e.g., an identification of the current website and an identification of the previously-visited website). A message can be generated and sent, for each of two questions "what's your pricing?" and "is your platform nice?", the conversational channel with the relevant answer for each of the two questions. In addition, if any answer includes additional navigation instructions in the metadata, then those additional navigation instructions will also be sent the non-conversational channel. In other words, an answer to a question in some instances can generate not only content for the conversational channel but also instructions for the non-conversational channel.

For end user input that is classified as "user-defined action", the instruction can be generated and sent based on the details and/or characteristics of the action defined (requested) by the user. For example, the end user input classified as "user-defined action" can be related to an action involving the digital asset (e.g., digital asset 167) that is defined by the user for example by the conversational channel such as "filter displayed search results to include just those matching my criteria". In this example, the instruction can be generated and sent to the non-conversational channel with the classification type ("user-defined action") and any relevant metadata (e.g., an indication of the current website, an indication of the displayed search results, and the details of the matching criteria for further filtering), to cause the digital asset to filter the search results based on the matching criteria and then display the filtered match results.

At 216, a determination is made as to whether the process is complete, for example, as indicated by a user ending the session by disconnecting from the user channel(s) and/or the digital website. If the process is not complete, then the process goes to 206 and continued until the determination at 216 is that the process is complete.

Variations of the method shown in and discussed with respect to FIG. 2 are possible. For example, the end user input received at 206 can include content that can be classified as two or more of "navigation," "input," "user-defined action" and "prompt." For example, end user input received at 206 can include a compound end user input similar to the compound statements/questions discussed above. In such situations, the classified end user input can result in sending over a first channel an instruction(s) with classification type and relevant metadata at 212 and concurrently (or separately) sending over a second channel a message with respect to the prompt at 214.

For another example, the end user input received at 206 can include content that can be classified as "prompt", resulting in sending over a second channel (e.g., a conversational channel) a message with respect to the prompt at 214 and the action(s) based on the message can trigger (or occur in parallel) an action on the first channel (e.g., a non-conversational channel). In other words, end user input can cause action on a conversational channel, which then triggers an action of the non-conversational channel. For a specific example, when viewing a webpage that requests user information, the user can provide end user input on the conversational channel such as a chat app or a voice app, stating "Take me to a webpage with more pricing information." This end user input can be classified as "prompt", resulting in a response on the conversational channel such as "Sure-please review the pricing information", which can in turn trigger (or occur in parallel) display of a webpage with pricing information on the non-conversational channel (i.e., navigating from the webpage that requests user information to webpage with pricing information). In an example variation, when viewing a webpage that requests user information in one format such as annual user income, the user can provide end user input on the conversation channel and indicating an answer in a second format such a monthly user income, which can be automatically converted by the conversation compute device from the answer in the provided format (e.g., monthly user income) to the answer in the requested format (e.g., annual user income).

For another specific example, the digital asset can be a software program such as a workflow builder that is displayed at the end user compute device (e.g., at a monitor or display of the end user compute device). Such a workflow builder can be, for example, a workflow builder described in U.S. Pat. No. 12,190,416, titled "Method and Apparatus for Contextually Intelligence Graph Generation" or U.S. patent application Ser. No. 19/985,972, titled "Apparatus and Methods for a No-Code Graphical user Interface to Define a System to Collect Unstructured Data Using Generative Artificial Intelligence (AI)", both of which are incorporated herein by reference. In this specific example, the end user can, for example, provide user-defined actions on the conversational channel such as "Build a workflow for purchasing tickets" or "Modify the workflow to include an unstructured dialog with a conversation participate", causing actions within the workflow builder and an updated display of the workflow on the digital asset via the non-conversational channel.

For yet another example, the end user input received at 206 can include content that can be classified as "navigation" (or "input" or "user-defined action"), resulting in sending over a first channel (e.g., a non-conversational channel) an instruction with respect to the navigation input at 212 and the instruction can trigger (or occur in parallel) an action on the second channel (e.g., a conversational channel). In other words, end user input can cause action on a non-conversational channel, which then triggers an action of the conversational channel. For a specific example, when viewing a webpage that requests user information, the user can provide end user input on the non-conversational channel such as on the webpage to navigate away from the webpage that requests user information to a webpage with pricing information. This end user input can be classified as "navigation", resulting in display of a webpage with pricing information on the non-conversational channel (i.e., navigating from the webpage that requests user information to the webpage with pricing information), which can in turn trigger (or occur in parallel) a response on the conversational channel such as "Please note the pricing information has been updated within the last 24 hours". This process for this example is similar to the scenarios discussed in U.S. Pat. No. 11,461,562, titled "Method for Multi-channel Audio Synchronization for Task Automation", which is incorporated herein by reference.

Figure 3:
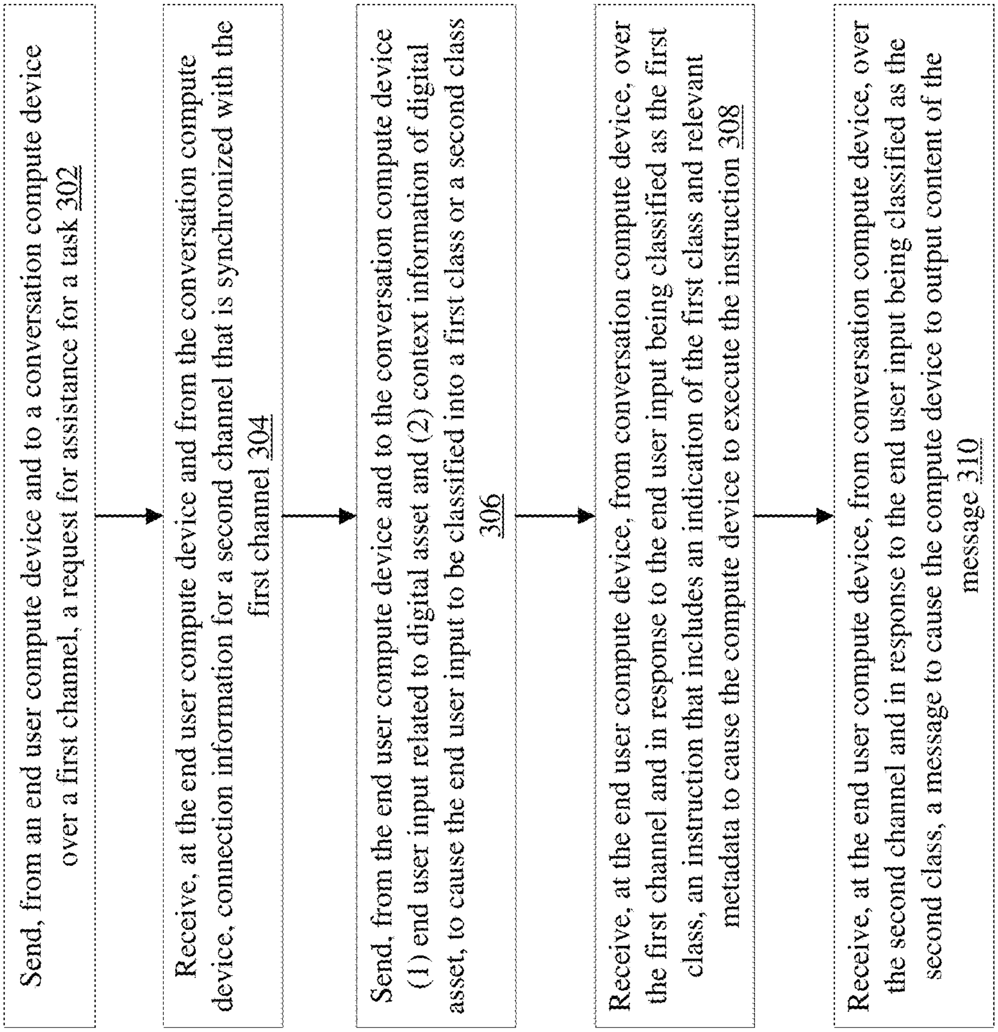
FIG. 3 shows a flowchart for performing a bi-directional interaction between a user channel(s) and a digital asset, according to another embodiment.

FIG. 3 shows a flowchart for performing a bi-directional interaction between a user channel(s) and a digital asset, according to an embodiment. As shown FIG. 3, at 302, a request for assistance for a task is sent from an end user device (e.g., end user device 160 shown in FIG. 1) over a first channel (e.g., a conversational channel such as a chat or a voice channel). The request can be sent to a conversation compute device (e.g., conversation compute device 100 of FIG. 1) different from the end user device. For example, the request for assistance can be in the form of a phone call over a voice channel from the end user compute device (e.g., a smartphone) such that the end user can engage with a smart interactive voice response (IVR) system that identifies the task to be resolved. Similarly, the end user compute device can be a voice-powered automated assistant implemented, for example, at a digital asset such as a website or mobile app, or at a physical asset such as a smart speaker; the voice-powered automated assistance can identify the task to be resolved. Alternatively, the request for assistance can be received over a chat channel (e.g., within a chat within a chat session) implemented, for example, through an interface of a digital asset such as a website or mobile app, or an interface of a physical asset such as a kiosk.

At 304, connection information for at least one additional channel (e.g., a second channel such as a conversation channel) is received at the end user compute device. For example, the end user can be presented with a method to engage in a second channel. The conversation compute device can send to the end user compute device and the end user compute device can receive, for example, a short message service (SMS) text message based on the phone number used by the end user compute device to initiate the phone call on the voice channel; the SMS text message can include unique hyperlink that leads to a digital asset (e.g., a website) upon selection of the hyperlink. A code is received at the end compute device with the message (e.g., SMS message, message via a mobile app, audio message via a smart speaker, etc.); the code can be entered by the end user into a digital asset of choice (e.g., website, mobile app, television (TV) app, etc.). A code, however, need not be received at the end user device if the end user started on the engagement on a channel that has support for multiple channels (e.g., a website or mobile app that has support for multiple channels such as a website or mobile app with a user-selectable button to start speaking over voice or start engaging over chat).

The first channel and the second channel can be synchronized based on the connection information. For example, after an end user has provided the code in the digital asset (e.g., entering the code on field of a page of a website), the first channel and the second channel can be synchronized so that the rest of the process described in connection with FIG. 3 can be used on information sent and/or received on the first channel and/or the second channel.

At 306, end user input related to the digital asset and context information of the digital asset is sent from the end user compute device. The end user input can be, for example, a request by the end user entered vocally or by typing (e.g., via keyboard). End user input that is provided by the end user vocally can be sent to a conversation engine (e.g., a conversation engine 114 of FIG. 1, which can be a natural language understanding (NLU) engine) that can interpret human speech or text. The context information of the digital asset can be, for example, information about the context of the state of the digital asset such as information about a website having a form, a website being a "contact us" page, a website having five other links on the page, etc. The context information can in addition or alternatively include information provided by the user and captured on the website such as the user's name, email address, mailing address, and/or etc.

The context information can include and/or can be identified, for example, based on the elements associated with a digital asset such as webpage elements (e.g., the fields) and any values contained within those webpage elements. Such context information can be, for example, provided from the digital asset by an application programming interface (API) call from a conversational compute device (such as conversational compute device 100 of FIG. 1), resulting in the context information being sent from the end user compute device (such as end user compute device 160 of FIG. 1) and received at the conversational compute device (such as conversational compute device 100 of FIG. 1). Alternatively, the context information can be predefined (preselected, predesignated, etc.) for each webpage of a website and pushed to a conversational compute device (such as conversational compute device 100 of FIG. 1). In other words, for a website that has been programmed to coordinate with a conversational compute device (such as conversational compute device 100 of FIG. 1) for example by a browser extension installed at the end user compute device (such as end user compute device 160 of FIG. 1), the webpage of that website with which the user is interacting can automatically (and repeatedly) push context information from the end user compute device to the conversational compute device (such as conversational compute device 100 of FIG. 1).

At 308, an instruction is received at the end user compute device, from conversation compute device, over the first channel (e.g., the non-conversational channel) and in response to the end user input being classified as the first class, with the classification type and any relevant metadata to cause the end user compute device to execute the instruction. For example, for end user input that is classified as "navigation", the instruction can identify classification as "navigation" and the related website page information such as {"classification": "navigation", "uri": "/pricing.html"}.

At 310, a message is received at the end user compute device, from conversation compute device, over the second channel (e.g., the conversational channel) and in response to the end user input being classified as the second class, with the relevant response to the prompt (e.g., the relevant answer when the prompt is a question) to cause the end user compute device to output the content of the message.

The classification of the end user input being classified as the first class (as referenced at 308) and/or the second class (as referenced at 310) can be performed as described in connection with FIGS. 1 and 2. For example, the classification can be performed at a conversation compute device such as conversation compute device 100 of FIG. 1.

Figure 4:
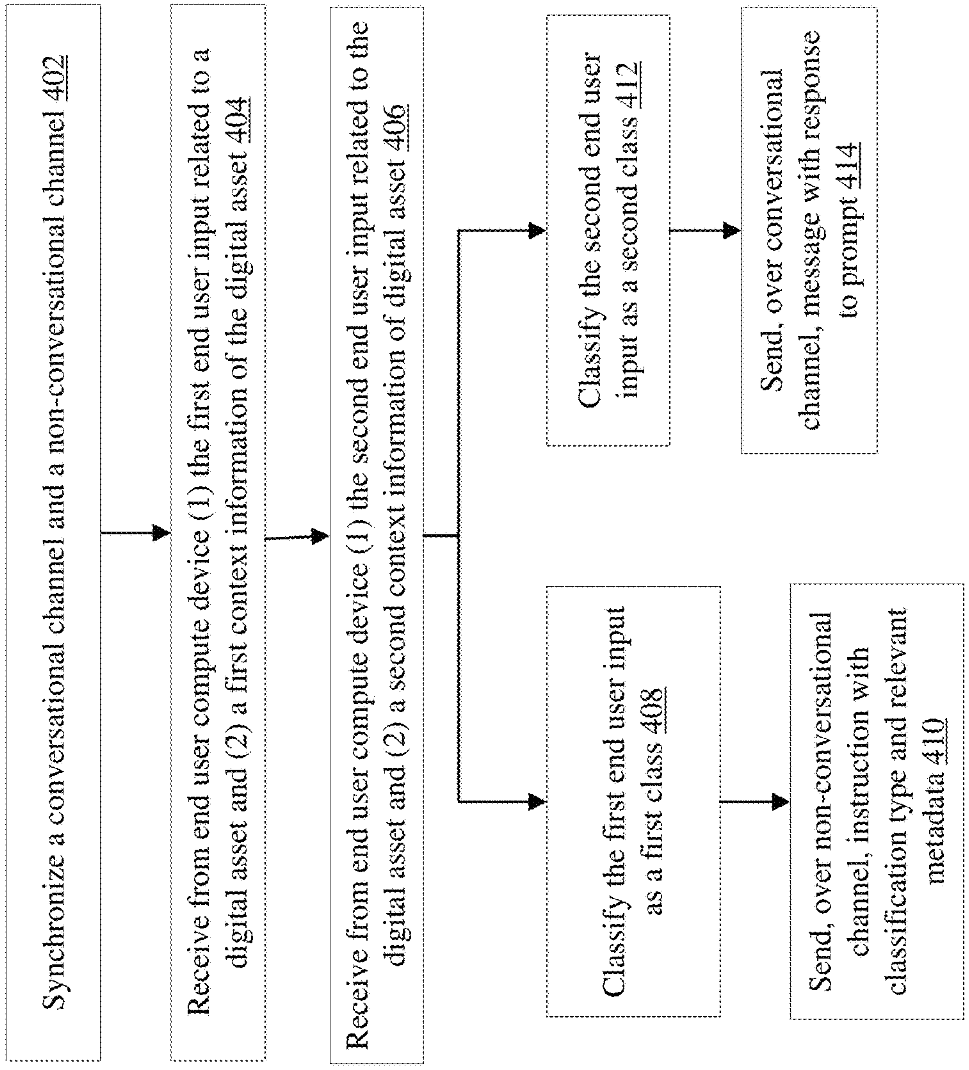
FIG. 4 shows a flowchart for performing a bi-directional interaction between a user channel(s) and a digital asset, according to yet another embodiment.

FIG. 4 shows a flowchart for performing a bi-directional interaction between a user channel(s) and a digital asset, according to yet another embodiment. At 402, a conversational channel and a non-conversational channel are synchronized. For example, the conversational channel and the non-conversational channel can be synchronized as described above in connection with FIGS. 2 and 3. Once the conversational channel and the non-conversational channel have been synchronized, the rest of the process described in connection with FIG. 4 can be used on information sent and/or received on the conversational channel and/or the non-conversational channel.

At 404, a first end user input related to the digital asset and context information of the digital asset is received from the end user compute device. The first end user input can be, for example, a request by the end user entered by typing (e.g., via keyboard) on the non-conversational channel. At 406, a second end user input related to the digital asset and context information of the digital asset is received from the end user compute device. The second end user input can be, for example, a request by the end user entered vocally on the conversational channel. The second end user input that is provided by the end user vocally can be sent to a conversation engine (e.g., a conversation engine 114 of FIG. 1, which can be a natural language understanding (NLU) engine) that can interpret human speech or text.

The context information of the digital asset can be, for example, information about the context of the state of the digital asset such as information about a website having a form, a website being a "contact us" page, a website having five other links on the page, etc. The context information can in addition or alternatively include information provided by the user and captured on the website such as the user's name, email address, mailing address, and/or etc.

At 408, the first end user input is classified as a first class (e.g., "navigation", "input" or "user-defined action"), then the process proceeds to 410. At 410, an instruction is sent to the end user via the non-conversational channel with the classification type and any relevant metadata. For example, for end user input that is classified as "navigation", the instruction can identify classification as "navigation" and the related website page information such as {"classification": "navigation", "uri": "/pricing.html"}. The instruction can be based on, for example, the context information.

At 412, if the end user input is classified as a second class (e.g., "prompt"), then the process proceeds to 414. At 414, a message is sent to the end user via the conversational channel with the relevant response to the prompt (e.g., the relevant answer when the prompt is a question). The message can be based on, for example, the context information.

The system described in FIG. 1 and the methods described in FIGS. 2-4 can supported, for example, by a software development kit (SDK) that can send and receive signals (e.g., over sockets) whether the end user takes action within the conversational channel or whenever the conversation engine (e.g., conversation engine 114 of FIG. 1) sends instructions back to the non-conversational channel. The SDK can be or include, for example, an instrumentation SDK (iSDK) that can be implemented as a software wrapper for an HTTP REST and socket API, and thus can be integrated with any compute device (computer, or computer system) that has internet connectivity.

One or more embodiments can be used in various situations and in various industries. For example, one or more embodiments can be used in contact centers (e.g., call centers) to assist with the completion of tasks. For schools and education, the tasks can relate to requesting a health response, reporting absences, and/or performing semester class registration. For travel and hospitality, the tasks can relate to upgrading air travel seats, requesting roadside assistance, updating account login information (e.g., when forgetting a login password), and/or reopening bookings. For banking, the tasks can relate to requesting credit card replacement, disputing transactions, and/or updating account login information. For insurance, the tasks can relate to submitting a claim and/or updating account login information. For technical support, the tasks can relate to updating account login information, verifying identity, and/or troubleshooting internet service provider (ISP) router/

Internet connection. More generally, the tasks can relate to onboarding/training courses to assist humans with familiarization of different tools, software or hardware. The tasks can relate, for example, to any situation where hands-free operation is desired or necessary such as driving, flying, space walks, during surgery, etc.

One or more embodiments have several benefits, which can include, for example, reducing operating costs of call centers as the cost of the solution is lower than the average cost for a live agent and/or increasing operational efficiency by automating tasks that would otherwise have to be human assisted or serviced. Additional benefits can include increasing accessibility and UX when dealing with complex digital assets or operating environments that benefit from and/or require hands-free. One or more embodiments have the benefit of educating the end user about a new or existing digital channel that it can use to self-service in the future. One or more embodiments can maintain or improve end user satisfaction by enabling fast and accurate self-service, e.g., offered 24x7, with expedited resolutions because the end user controls the outcome of its experience. One or more embodiments can also provide a wide range of analytics and insights that can help improve the use of the method as well as the overall experience because bi-directional analytics (what the user says, what the user does etc.) can be collected.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., “one or the other but not both”) when preceded by terms of exclusivity, such as “either,” “one of,” “only one of,” or “exactly one of.” “Consisting essentially of,” when used in the embodiments, shall have its ordinary meaning as used in the field of patent law.

As used herein in the specification and in the embodiments, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

What is claimed is:

1. A processor-readable non-transitory medium storing code representing instructions to be executed by a processor, the code comprising code to cause the processor to:
- receive, from a compute device and over a first channel, a request associated with a digital asset;
- send, to the compute device, over the first channel and in response to the request, connection information for a second channel;
- synchronize the first channel and the second channel such that a shared session context is maintained between them;
- receive, from the compute device, (1) end user input related to the digital asset and (2) context information of the digital asset;
- perform a semantic analysis on the end user input to classify an intent of the user into at least one of a first class or a second class, the first class indicative of a command to directly manipulate a user interface of the digital asset, the second class corresponding to a conversational query seeking information;
- send, to the compute device, over the first channel and in response to the end user input being classified as the first class, an instruction that includes an indication of the first class and relevant metadata to cause the compute device to execute the instruction by manipulating the user interface; and
- send, to the compute device, over the second channel and in response to the end user input being classified as the second class, a natural language message to cause the compute device to output content of the natural language message.

2. The processor-readable non-transitory medium of claim 1, wherein the first channel is a non-conversational channel, and the second channel is a conversational channel.

3. The processor-readable non-transitory medium of claim 1, wherein the end user input is a first end user input, and the code further comprises code to cause the processor to:
- receive, from the compute device, a second end user input after the compute device output the content of the natural language message.

4. The processor-readable non-transitory medium of claim 1, wherein the natural language message is a first natural language message, the end user input is a first end user input, and the code further comprises code to cause the processor to:
- not send, in response to a second end user input being classified as the second class, a second natural language message in response to the second end user input being unrelated to a context of information sent and received on the first channel.

5. The processor-readable non-transitory medium of claim 1, wherein the end user input includes a first portion that is classified into the first class and a second portion that is classified into the second class.

6. The processor-readable non-transitory medium of claim 1, wherein the second class is a prompt class, the first class is a navigation class, an input class or a user-defined action, and a third class is a remaining of the navigation class, the input class and the user-defined action, the code further comprises code to cause the processor to:
- send, to the compute device, over the first channel and in response to the end user input being classified as the third class, an instruction that includes an indication of the third class and relevant metadata to cause the compute device to execute the instruction by navigating the digital asset based on at least one of the indication of the third class of the relevant metadata associated with the indication of the third class.

7. The processor-readable non-transitory medium of claim 1, wherein the code to receive includes code to receive, from the compute device, context information of the digital asset in response to an application programming interface (API) call.

8. The processor-readable non-transitory medium of claim 1, wherein the code to receive includes code to receive, from the compute device, context information of the digital asset in response to a push action from the compute device.

9. A method, comprising:
- sending, from a compute device and over a first channel, a request associated with a digital asset;
- receiving, at the compute device, over the first channel and in response to the request, connection information for a second channel that is synchronized with the first channel;
- synchronizing, via a shared session context, the first channel with the second channel;
- sending, from the compute device, (1) end user input related to the digital asset and (2) context information of the digital asset, to cause the end user input to be classified, based on a semantic analysis of an intent of the user, into at least one of a first class indicative of to a command to directly manipulate a user interface of the digital asset, or a second class corresponding to a conversational query seeking information;

receiving, at the compute device, over the first channel and in response to the end user input being classified as the first class, an instruction that includes an indication of the first class and relevant metadata to cause the compute device to execute the instruction by manipulating the user interface; and receiving, at the compute device, over the second channel and in response to the end user input being classified as the second class, a natural language message to cause the compute device to output content of the natural language message.

10. The method of claim 9, wherein the first channel is a non-conversational channel, and the second channel is a conversational channel.

11. The method of claim 9, wherein the end user input is a first end user input, the method further comprising:

sending, from the compute device, a second end user input after the compute device outputs the content of the natural language message.

12. The method of claim 9, wherein the natural language message is a first natural language message, the end user input is a first end user input, the method further comprising:

not receiving, in response to a second end user input being classified as the second class, a second natural language message in response to the second end user input being unrelated to a context of information sent and received on the first channel.

13. The method of claim 9, wherein the end user input includes a first portion that is classified into the first class and a second portion that is classified into the second class.

14. The method of claim 9, wherein the second class is a prompt class, the first class is a navigation class, an input class or a user-defined action, and a third class is a remaining of the navigation class, the input class and the user-defined action, the method comprising:

receiving, at the compute device, over the first channel and in response to the end user input being classified as the third class, an instruction that includes an indication of the third class and relevant metadata to cause the compute device to execute the instruction by navigating the digital asset based on at least one of the indication of the third class of the relevant metadata associated with the indication of the third class.

15. The method of claim 9, wherein the sending the context information includes sending, from the compute device, the context information of the digital asset in response to an application programming interface (API) call.

16. The method of claim 9, wherein the sending includes pushing the context information of the digital asset as instructed by a browser extension.

17. An apparatus, comprising:

a processor; and a memory coupled to the processor and storing instructions that when executed causes the processor to:

synchronize a conversational channel and a non-conversational channel, associated with a compute device, by maintaining a shared session context;

receive, from the compute device over the non-conversational channel, a first end user input related to a digital asset and a first context information of the digital asset;

receive, from the compute device over the conversational channel a second end user input related to the digital asset and a second context information of the digital asset;

classify, via a semantic analysis of user intent, the first end user input into a first class indicative of to a command to directly manipulate a user interface of the digital asset;

classify, via the semantic analysis of the user intent, the second end user input into a second class different than the first class and corresponding to a conversational query seeking information;

send, to the compute device, over the non-conversational channel and in response to the first end user input being classified as the first class, an instruction that includes an indication of the first class and relevant metadata to cause the compute device to execute the instruction by manipulating the user interface; and send, to the compute device, over the conversational channel and in response to the second end user input being classified as the second class, a natural language message to cause the compute device to output content of the natural language message.

18. The apparatus of claim 17, wherein the second class is a prompt class, the first class is a navigation class, an input class or a user-defined action, and a third class is a remaining of the navigation class, the input class and the user-defined action, the instructions further comprising instructions to cause the processor to:

send, to the compute device, over the non-conversational channel and in response to the end user input being classified as the third class, an instruction that includes an indication of the third class and relevant metadata to cause the compute device to execute the instruction by navigating the digital asset based on at least one of the indication of the third class of the relevant metadata associated with the indication of the third class.

19. The apparatus of claim 17, wherein the instructions to receive includes instructions to receive, from the compute device, context information of the digital asset in response to an application programming interface (API) call.

20. The apparatus of claim 17, wherein the instructions to receive includes instructions to receive, from the compute device, context information of the digital asset in response to a push action from the compute device.

* * * * *